United States Patent [19]

Blanton, Jr. et al.

[11] 4,166,787

[45] Sep. 4, 1979

[54] SULFUR OXIDES CONTROL IN CATALYTIC CRACKING

[75] Inventors: William A. Blanton, Jr., San Anselmo; Joseph Jaffe, Berkeley, both of Calif.

[73] Assignee: Chevron Research Company, San Francisco, Calif.

[21] Appl. No.: 861,320

[22] Filed: Dec. 16, 1977

[51] Int. Cl.$^2$ .................. C10G 11/04; B01J 21/20; C01B 17/60

[52] U.S. Cl. .................................. 208/120; 208/113; 252/417; 252/455 Z; 255/477 R; 423/244; 423/563

[58] Field of Search .................. 208/113, 120; 423/244

[56] References Cited

U.S. PATENT DOCUMENTS

| | | | |
|---|---|---|---|
| 4,071,436 | 1/1978 | Blanton et al. | 208/120 |
| 4,091,076 | 5/1978 | Vogel et al. | 423/244 |
| 4,115,249 | 9/1978 | Blanton et al. | 208/120 |
| 4,115,250 | 9/1978 | Blanton et al. | 208/120 |
| 4,115,251 | 9/1978 | Blanton et al. | 208/120 |

Primary Examiner—Delbert E. Gantz
Assistant Examiner—G. E. Schmitkons
Attorney, Agent, or Firm—D. A. Newell; R. H. Davies; W. D. Reese

[57] ABSTRACT

The amount of sulfur oxides in flue gas evolved in a catalyst regenerator in a catalytic cracking system is lowered by incorporating into the cracking catalyst, before using the catalyst in the cracking system, finely divided, high surface area alumina which has been calcined at 700°–1600°0 F. before incorporation into the catalyst. Sulfur oxides react with the calcined alumina in the regenerator to form a sulfur-containing solid. The sulfur-containing solid reacts with hydrocarbon to form fluid sulfur compounds in the FCC reactor, and the sulfur compounds exit the reactor mixed with the cracked hydrocarbons.

10 Claims, No Drawings

SULFUR OXIDES CONTROL IN CATALYTIC CRACKING

BACKGROUND OF THE INVENTION

The present invention relates to an improved catalytic cracking process wherein the amount of sulfur compounds in the catalyst regenerator flue gas is reduced.

Catalytic cracking systems use a moving bed or a fluidized bed of particulate catalyst. The catalyst is continuously cycled between a cracking reaction zone and catalyst regeneration zone. In a fluidized cracking (FCC) system, a hydrocarbon feed stream is contacted with fluidized catalyst particles in a hydrocarbon cracking zone, or reactor, usually at a temperature of about 800°–1100° F. The reactions of hydrocarbons at this temperature result in deposition of carbonaceous coke on the catalyst particles. The cracked hydrocarbons are thereafter separated from the coked catalyst and withdrawn from the cracking conversion zone. The coked catalyst is then stripped of volatiles and passed to a catalyst regeneration zone. In the regenerator, the coked catalyst is contacted with a gas containing a controlled amount of molecular oxygen to burn off a desired portion of coke and simultaneously to heat the catalyst to a high temperature desired when the catalyst is again contacted with the hydrocarbon stream in the cracking zone. A flue gas is also formed by the burning procedure. After coke burnoff, the catalyst is returned to the cracking zone, where it vaporizes hydrocarbons and catalyzes hydrocarbon cracking. The flue gas is separately removed from the regenerator, and is normally passed into the atmosphere after treatment to remove particulates and carbon monoxide from it.

The product stream recovered from the reactor in a catalytic cracking unit includes a light gas fraction and a liquid hydrocarbon fraction. The term "light gas fraction", as used herein, means all components of the fluid products stream which have a normal boiling point below the boiling point of propane. The term "liquid hydrocarbon fraction", as used herein, means all $C_3$ and higher boiling components of the fluid products stream. The yield of the liquid hydrocarbon fraction is normally represented in terms of volume percent of the hydrocarbon feed to the FCC reactor. Since the liquid hydrocarbon fraction contains substantially all the valuable components in the fluid product stream, the level of volume percent liquid product yield is one of the most important indications of the practicability of a particular FCC operation. A decline in liquid product yield of greater than one volume percent of the feed rate as a result of any change in process parameters is a sufficiently negative result that the change in parameters cannot be economically tolerated in commercial operations. Thus, any deviation from normal, optimum operation of an FCC unit that results in a decline in liquid product yield of over about one percent is impracticable.

The hydrocarbon feeds processed in commercial FCC units normally contain sulfur, herein termed "feed sulfur". It has been found that about 2–10% or more of the feed sulfur in a hydrocarbon feed stream processed in an FCC system is invariably deposited on the catalyst particles in the coke. This sulfur, herein termed "coke sulfur", is eventually cycled from the conversion zone with the coked (spent) catalyst to the regenerator. About 2–10% or more of the feed sulfur is thus continuously passed from the conversion zone into the catalyst regeneration zone with the coked catalyst.

In an FCC catalyst regenerator, coke sulfur is burned, along with the coke carbon. The primary resulting sulfur compounds are gaseous sulfur dioxide and sulfur trioxide. These are conventionally removed from the regenerator in the flue gas.

Most of the feed sulfur does not become coke sulfur in the reactor. Instead, it is converted to normally gaseous sulfur compounds, e.g., hydrogen sulfide and carbon oxysulfide, or remain as higher-boiling-range organic sulfur compounds. These fluid sulfur compounds are conventionally removed from the reactor along with the fluid hydrocarbon products. About 90% or more of the feed sulfur is continuously removed from the reactor with processed hydrocarbons, 40–60% of this being hydrogen sulfide. Means are conventionally provided for recovering hydrogen sulfide from the fluid reactor effluent. Typically, a very-low-molecular-weight off-gas stream is separated from the $C_3+$ liquid hydrocarbons in a gas recovery unit and is treated, as by scrubbing it with an amine solution, to remove the hydrogen sulfide. Removal of sulfur compounds such as hydrogen sulfide from the fluid effluent from an FCC reactor is relatively simple and inexpensive as compared to conventional methods for removal of sulfur oxides from an FCC regenerator flue gas.

It has been suggested to reduce the amount of sulfur in FCC regenerator flue gas in commercial units, when necessary, by either: (1) desulfurizing the hydrocarbon FCC feed in a separate desulfurization unit to reduce the amount of feed sulfur prior to processing the feed in the FCC unit; or (2) desulfurizing the regenerator flue gas itself, by a conventional flue gas desulfurization procedure, after the flue gas has been removed from the FCC regenerator. Both of the foregoing alternatives require elaborate additional processing operations and necessitate substantial additional capital and utilities expenses. For this reason, the cost of processing high-sulfur feedstocks in FCC units is high. Yet, many of the petroleum stocks currently available for processing in FCC units have a high sulfur content. The inclusion of expensive extraneous equipment and procedures in refinery operations to reduce the amount of sulfur in the flue gas removed from an FCC unit is a major problem in commercial FCC processing systems.

If gaseous sulfur compounds normally removed from the unit in the flue gas can instead be removed from the reactor as hydrogen sulfide along with the processed hydrocarbons, the shifted sulfur is simply a small addition to the large amount of hydrgoen sulfide and organic sulfur already present in the reactor effluent. The small added expense, if any, of removing even as much as 5–15% more hydrogen sulfide from FCC reactor off-gas using available hydrogen sulfide removal means is substantially less than the expense incurred if separate feed desulfurization or flue gas desulfurization is instead used to reduce the amount of sulfur in the regenerator flue gas. Hydrogen sulfide recovery systems used with present commercial FCC units usually have unused capacity sufficient to remove additional hydrogen sulfide from the reactor off-gas. Existing off-gas hydrogen sulfide removal can thus handle the additional hydrogen sulfide which would be added to the off-gas if feed sulfur were substantially all removed from the FCC system in the hydrocarbon reactor effluent. It is accordingly more desirable to direct substantially all feed sulfur into the fluid products removal pathway from the reactor to reduce the amount of sulfur in the FCC regenerator flue gas, than either to desulfurize the hydrocarbon feed prior to charging it to the FCC conversion zone or to desulfurize the regenerator flue gas after it is removed from the FCC regenerator.

It has been suggested, for example in U.S. Pat. No. 3,699,037, L to reduce the amount of sulfur oxides in FCC regenerator flue gas by adding particles of Group II-A metal oxides and/or carbonates, such as dolomite, MgO or $CaCO_3$, to the circulating catalyst in an FCC unit. The Group II-A metals react with sulfur oxides in the flue gas to form solid sulfur-containing compounds. The Group II-A metal oxides lack physical strength, and regardless of the size of particles introduced, they are rapidly reduced to fines by attrition, and rapidly pass out of the FCC unit with the catalyst fines. Thus, addition of dolomite and the like Group II-A materials must be continuous, and large amounts of the materials must be employed, in order to reduce the level of flue gas sulfur oxides for any significant period of time.

It has also been suggested, for example in U.S. Pat. No. 3,835,031, to reduce the amount of sulfur oxides in FCC regenerator flue gas by impregnating a Group II-A metal oxide onto a conventional silica-alumina cracking catalyst. The attrition problem encountered when using unsupported Group II-A metals is thereby reduced. However, it has been found that Group II-A metal oxides, such as magnesia, when used as a component of cracking catalysts, have a highly undesirable effect on the activity and selectivity of the cracking catalyst. The addition of a Group II-A metal to a cracking catalyst results in two particularly noticeable adverse consequences relative to the results obtained without the Group II-A metals: (1) the yield of the liquid hydrocarbon fraction is substantially reduced, typically by greater than one volume percent of the feed volume; and (2) the octane rating of the gasoline or naphtha fraction (75°–430° F. boiling range) is substantially reduced. Both of the above adverse consequences are severely detrimental to the economic viability of an FCC operation, and even complete removal of sulfur oxides from regenerator flue gas could not compensate for the losses in yield and octane which result from adding Group II-A metals to an FCC catalyst.

Alumina has been a component of many FCC and other cracking catalysts, but primarily in intimate chemical combination with silica. Alumina itself has low acidity and is generally considered to be undesirable for use as a cracking catalyst. The art has taught that alumina is nonselective, i.e., the cracked hydrocarbon products recovered from an FCC or other cracking unit using an alumina catalyst would not be the desirable valuable products, but would include, for example, relatively large amounts of $C_2$ and lighter hydrocarbon gases. Intimate combinations of alumina with silica, e.g., as cogels, clays, zeolites, etc., have been found to be high in acidity, and are excellent cracking catalysts. They are used in most, if not all, commercial FCC units.

Copending application Ser. No. 666,115 (now U.S. Pat. No. 4,071,456) discloses that alumina can be circulated in an FCC system in order to shift sulfur from the regenerator flue gas to the reactor effluent. The alumina can be used either as a component of the catalyst particles or in the form of separate particles physically mixed with the catalyst particles.

Copending application Ser. No. 751,640 (now U.S. Pat. No. 4,115,249) discloses that sulfur can be shifted from the regenerator flue gas to the reactor effluent in an FCC system by circulating in the system a silica-containing catalyst which has been calcined and then impregnated with alumina or a compound decomposable to alumina.

Virtually all FCC catalysts presently used include a gel or clay type silica-alumina matrix in which are dispersed particles of a zeolitic crystalline aluminosilicate. One method used commercially for manufacturing the catalysts used in FCC systems involves formation of a silica-alumina cogel, addition of small particles of a zeolite to the cogel, and formation of catalyst particles by spray-drying. Another commercial method for manufacturing FCC catalyst involves formation of zeolite particles in situ in a silica-alumina mixture such as a clay, by heat, pressure, acid treatment, etc., followed by spray-drying particle formation.

Several U.S. patents describe the incorporation of fine particles of an inorganic oxide into catalyst particles. U.S. Pat. No. 2,487,065 discloses dispersing a fine powder of fused alumina, clay, pumice or the like into an inorganic acid sol, setting the sol into a hydrogel, and drying particles of the hydrogel to form a catalyst or catalyst base. U.S. Pat. No. 2,727,868 describes thermal treatment of kaolin clay, followed by mixing the clay with a silica gel. U.S. Pat. No. 2,935,463 describes physical mixtures of alumina into clays and synthetic silica-alumina mixtures. U.S. Pat. No. 3,193,511 describes dispersing into a silica-alumina matrix 2- to 7- micron-diameter particles of alpha-alumina which has been calcined at above 2000° F. U.S. Pat. No. 3,224,961 shows physical mixture or precipitation of alumina into silica-alumina particles. U.S. Pat. No. 3,312,615 describes physical mixture of molecular sieve particles and alpha-alumina particles into a silica-alumina matrix. U.S. Pat. No. 3,542,670 describes formation of a physical mixture of hydrated alumina and zeolite particles with a silica-alumina hydrogel. U.S. Pat. No. 3,788,977 describes the addition of molecular sieve particles and alumina particles to a clay or synthetic silica-alumina matrix. The alumina used has previously been impregnated with platinum or uranium. U.S. Pat. No. 3,933,621 describes the manufacture of an FCC catalyst containing 56–90 weight percent alumina. U.S. Pat. No. 4,012,339 describes the use of calcined alumina fines in the preparation of an extruded catalyst.

SUMMARY OF THE INVENTION

In an embodiment, the present invention relates to an improved method employed in a fluid catalytic cracking process including the steps of (a) cracking a sulfur-containing hydrocarbon stream in contact with a fluidized bed of cracking catalyst particles, the particles containing silica, in a cracking zone at cracking conditions including a temperature in the range from 800° F. to 1300° F., whereby sulfur-containing coke is deposited on the catalyst, and removing the hydrocarbon stream from the cracking zone; (b) passing coke-containing catalyst from the cracking zone and an oxygen-containing gas into a cracking catalyst regeneration zone, burning off the sulfur-containing coke therein at a temperature in the range from 1000° F. to 1500° F. to form a flue gas containing sulfur oxides, and removing the flue gas from the catalyst regeneration zone; and (c) returning the resulting coke-depleted catalyst from the catalyst regeneration zone to contact with the hydrocarbon stream in the cracking zone; the present improved method for decreasing the amount of sulfur oxides in the flue gas comprising:

(1) physically incorporating into in at least a portion of the catalyst particles, before contacting the catalyst particles with the feed, from 0.1 to 25 weight percent of a finely divided additive material consisting essentially of alumina, the material having an average particle diameter of less than 50 microns, the alumina having a surface area of between 40 and 400 square meters per gram, and the alumina having been heated to a temperature between about 700° F. and about 1600° F. before physical incorporation into the catalyst particles; and (2) forming a solid compound containing a sulfur component by reacting sulfur trioxide with alumina in the material in the regeneration zone, and forming hydrogen sulfide in the cracking zone by contacting the solid compound with the hydrocarbon stream.

We have found that when a high surface area alumina having a particle diameter of less than 50 microns, preferably less than 10 microns, is physically incorporated into silica-containing cracking catalyst particles after having been calcined at a temperature of 700°–1600° F., preferably above 1300° F., the resulting catalyst particles have a surprisingly enhanced capacity for reaction with sulfur oxides in an FCC catalyst regenerator. By using a cracking catalyst, into which the calcined $Al_2O_3$ particles have been physically incorporated, e.g., during manufacture, the amount of sulfur compounds in the flue gas removed from an FCC catalyst regenerator can be substantially reduced.

DETAILED DESCRIPTION OF THE INVENTION

The present invention is used in conjunction with a fluid catalyst cracking process for cracking hydrocarbon feeds. The same sulfur-containing hydrocarbon feed normally processed in commercial FCC systems may be processed in a cracking system employing the present invention. Suitable feedstocks include, for example, gas oils, light cycle oils, heavy cycle oils, etc., which usually contain about 0.1–10 weight percent sulfur. Sulfur may be present in the feed as a thiophene, disulfide, thioether, etc. Suitable feedstocks normally boil in the range from about 400°–1100° F. or higher. A suitable feed may include recycled hydrocarbons which have already been cracked. Residual fractions often include a large concentration of sulfur and may advantageously be treated with the catalyst formed according to the invention.

Cracking conditions employed in the cracking or conversion step in an FCC system are frequently provided in part by pre-heating or heat-exchanging hydrocarbon feeds to bring them to a temperature of about 600°–750° F. before introducing them into the cracking zone; however, pre-heating of the feed is not essential. Cracking conditions include a catalyst/hydrocarbon weight ratio of about 3–10. A hydrocarbon weight space velocity in the cracking zone of about 2–50 per hour is preferably used. The average amount of coke contained in the catalyst after contact with the hydrocarbons in the cracking zone, when the catalyst is passed to the regenerator, is preferably between about 0.5 weight percent and about 25 weight percent, depending in part on the carbon content of regenerated catalyst in the particular system, as well as the heat balance of the particular system.

The catalyst regeneration zone used in an FCC system employing an embodiment of the present invention may be of conventional design. The gaseous atmosphere inside the regeneration zone is normally comprised of a mixture of gases in concentrations which vary according to the locus within the regenerator. The concentrations of gases also vary according to the coke concentration on catalyst particles entering the regenerator and according to the amount of molecular oxygen and steam passed into the regenerator. Generally, the gaseous atmosphere in a regenerator contains 5–25% steam, varying amounts of oxygen, carbon monoxide, nitrogen, carbon dioxide, sulfur dioxide, and sulfur trioxide. In order to facilitate removal of sulfur contents from the regenerator flue gas within the regenerator according to the invention, it is preferred that relatively coke-free catalyst particles must contact the gaseous regenerator atmosphere at a locus at which the atmosphere contains sulfur trioxide or molecular oxygen and sulfur dioxide. In regenerators of conventional design, the flue gas includes the desired components, and catalyst particles normally contact the flue gas after having been freed of a substantial amount of coke. When regenerators of this type are employed, contact between relatively coke-free catalyst particles and sulfur trioxide or oxygen and sulfur dioxide is facilitated.

According to one aspect of the invention, a carbon monoxide combustion promoter may be employed in the cracking system. The carbon monoxide combustion promoters which are suitable for use are the metals platinum, palladium, iridium, rhodium, osmium, ruthenium, copper and chromium, or compounds thereof, such as the oxides, sulfides, sulfates, etc. At least one of the foregoing metals or metal compounds is used, and mixtures of two or more of the metals are also suitable. For example, mixtures of platinum and palladium or copper and chromium are suitable. The effect of the above-mentioned carbon monoxide combustion promoter metals may be enhanced by combining them with small amounts of other metals or metalloids, particularly rhenium, tin, germanium, or lead.

The carbon monoxide combustion promoter is preferably employed in the FCC system in association with a particulate solid other than the FCC catalyst particles. The promoter may alternatively be present in an insubstantial portion (e.g., less than 5% and preferably less than 1%) of the FCC catalyst particles. In any case, the promoter metal is present in particles which are only in physical mixture with all or substantially all of the FCC catalyst particles. The promoter metal is preferably present on a particulate solid in a relatively high concentration. The total amount of promoter metal added to the system may be sufficient to promote combustion of only part, or alternatively, most or substantially all, of the carbon monoxide produced in an FCC regenerator. It is preferred that the total amount of platinum added to an FCC system be between about 0.01 and 100 parts per million, by weight, with an amount between about 0.1 and 10 parts per million being particularly preferred, with respect to the total amount of catalyst in the system. It will be apparent that the amount of platinum present in a given discrete particle added to an FCC system will be greater when fewer particles containing the promoter are added. The concentration of platinum can range up to 2 weight percent, or higher, if desired, in cases where a very small number of particulate, platinum-containing material is added to an FCC system. Preferably, however, the amount of platinum added to a particulate solid is kept at less than 1 weight percent of the total weight of the particles. An amount of platinum added to discrete solids of about 0.01 to 1 weight percent of the total weight of the discrete solids is a preferred range for use.

The amount of Group VIII noble metals other than platinum is generally between about 2 times to 10 times higher total concentration in the FCC system, with respect to the total amount of catalyst, than is used when a platinum promoter is employed. Thus, the amount of the Group VIII metal such as palladium, iridium, etc., can be calculated from the above noted concentration of a platinum promoter, and at least twice as much and preferably 5 times as much of other Group VIII noble metals is used. The concentration of the other Group VIII noble metals on any discrete particle in the FCC system, is usually kept below about 2 weight percent, and preferably below about 1 weight percent.

The amount of copper used in an FCC system as a promoter is generally about 100 to about 5000 times higher total concentration in the system, with respect to the total amount of catalyst used, than the amount of platinum which would be used in the same system. The concentration of copper promoter on any discrete particle is usually kept below about 20 weight percent, and preferably below about 10 weight percent.

The amount of chromium used in an FCC system as a promoter is generally between about 500 and about 25,000 times higher total concentration in the system, with respect to the total amount of catalyst, than the amount of platinum which would be employed in the same system. The concentration of chromium added in, e.g., a chromium compound impregnated on any discrete particle in the FCC system, is usually kept below about 20 weight percent of the total particle weight, and preferably below about 10 weight percent.

The promoter metal is added to the FCC system in association with a discrete particulate solid, which is physically admixed with the FCC catalyst in circulation in the system. The particulate solid can be any material which is suitable for circulation in an FCC system in particulate form in admixture with the catalyst. Particularly suitable materials are the porous inorganic oxides, such as alumina and silica, or mixtures of two or more inorganic oxides, such as silica-alumina, natural and synthetic clays and the like, crystalline aluminosilicate zeolites, etc. Gamma alumina is particularly good. The promoter metal can be added to a particulate solid in any suitable manner, as by impregnation or ion exchange, or can be added to a precursor of a particulate solid, as by coprecipitation from an aqueous solution with an inorganic oxide precursor sol. The particulate solid can be formed into particles of a size suitable for use in an FCC system by conventional means, such as spray-drying, crushing of larger particles to the desired size, etc.

A particulate solid which contains at least one promoter metal or metal compound of the type mentioned above can be admixed with the bulk of FCC catalyst prior to charging the catalyst to an FCC unit. Likewise, the particulate solid containing a promoter can be added to an FCC unit separately from the catalyst in the desired amount.

When the promoter metal is employed in the system, and particularly when the promoter metal is present in a relatively high concentration in a particulate solid physically admixed with the cracking catalyst, it is preferred to perform at least a major portion of the combustion of all carbon monoxide in the catalyst regenerator in a dense catalyst phase region within the regenerator. By a dense catalyst phase region, is meant that the catalyst density in the region is at least 10 pounds per cubic foot.

Particularly when using a separate particulate oxidation promoter physically mixed with the cracking catalyst, it is also preferred to introduce sufficient oxygen into the regeneration zone in an FCC system so that a minimum molecular oxygen content of 0.5 volume percent, and preferably at least 1.0 volume percent, is maintained in the atmosphere in the regeneration zone.

Particularly when using a separate particulate oxidation promoter physically mixed with the cracking catalyst, it is also preferred to burn a sufficient amount of coke off the catalyst in the regeneration zone so that the average concentration of carbon in regenerated catalyst cycled from the regeneration zone to the cracking zone is below 0.2 weight percent.

The cracking catalyst used in the present process, aside from the finely divided, calcined alumina, contains a porous, refractory material which includes silica. Suitable inorganic oxides which may be included in the catalyst in addition to silica are alumina, magnesia, boria, bauxite, titania, etc. Suitable refractory materials include natural and treated clays, kieselguhr, diatomaceous earth, kaolin, mullite, etc. Mixtures of two or more of the above materials with each other or with other materials may also be employed. Suitable synthetic materials may be prepared in a conventional manner by the use of a hydrosol and hydrogel. Preferred silica-containing materials are siliceous gels or cogels and natural siliceous materials such as clays, which may be treated, e.g., by acid leaching. Particularly suitable materials are amorphous mixtures of silica-containing inorganic oxides such as silica-aluminas, silica-magnesias, and such amorphous oxide mixtures combined with natural clays and clay-like materials. Amorphous silica-alumina mixtures are particularly preferred.

The cracking catalyst preferably includes an acidic crystalline aluminosilicate zeolite associated with the silica component-containing refractory organic oxide material. The zeolite component is preferably present in an amount between 1 and 30 weight percent of the catalyst weight, particularly preferably between 5 and 20 weight percent. A zeolite component employed in the catalyst may be of any type, natural or synthetic, known to be useful in FCC cracking catalyst. The crystalline aluminosilicates used are typically made up of tetracoordinated aluminum atoms associated through oxygen atoms with adjacent silicon atoms in the crystal structure. Most zeolites are prepared or occur naturally in the sodium form, so that sodium cations are associated with the electronegative sites in the crystal structure of the zeolites. Among the naturally occurring crystalline aluminosilicate zeolites which may be used in the catalyst are particularly faujasite, mordenite, clinoptilolite, chabazite, analcite, erionite, as well as levynite, dachiardite, paulingite, noselite, ferriorite, heulandite, scolecite, stibite, harmotome, phillipsite, brewsterite, flarite, datolite, gmelinite, canrinite, leucite, lazurite, scaplite, mesolite, ptliolite, nepheline, matrolite and sodalite. Of the synthetic crystalline aluminosilicate zeolites which are useful in forming the catalyst, may be particularly mentioned Zeolite X, U.S. Pat. Nos. 2,882,244; Zeolite Y, 3,130,007; and Zeolite A, 2,882,243; as well as Zeolite B, 3,008,803; Zeolite D, Canada Pat. Nos. 661,981; Zeolite E. Canada Pat. No. 614,495; Zeolite F, U.S. Pat. Nos. 2,996,358; Zeolite H, 3,010,789; Zeolite J, 3,011,869; Zeolite L, Belgian Pat.

No. 575,177; Zeolite M, U.S. Pat. Nos. 2,995,423; Zeolite O, 3,140,252; Zeolite Q, 2,991,151; Zeolite S, 3,054,657; Zeolite T, 2,950,952; Zeolite W, 3,012,853; Zeolite Z, Canada Pat. Nos. 614,495; and Zeolite Omega, 817,915. The zeolites described in U.S. Pat. Nos. 3,140,249 and 3,140,253 are also suitable for use. The crystalline aluminosilicate zeolites having a faujasite-type crystals structure are particularly preferred. This includes particularly natural faujasite and Zeolite X and Zeolite Y.

The presence of a substantial proportion of sodium cations in the crystal structure of zeolites is known to make them less catalytically active when exposed to hydrocarbon conversion conditions. Accordingly, a zeolite used in the composition is preferably ion-exchanged before or after its incorporation as a component of the catalyst particles. Suitable cations for replacement of sodium in the zeolite crystal structure include ammonium (decomposing to hydrogen), hydrogen, rare earth metals, alkaline earth metals, etc. Various suitable ion-exchange procedures and cations which may be exchanged into the zeolite crystal structure are well known to those skilled in the art.

According to the invention, a finely divided solid consisting essentially of alumina is physically incorporated into the FCC catalyst particles as a distinct phase in the particles prior to using the cracking catalyst in an FCC system. Prior to incorporation in the catalyst particles, the alumina is heated to a temperature of 700° F. to 1600° F. Preferably the alumina is heated to a temperature of 1300° F. to 1500° F. before incorporation into the catalyst particles. Suitable alumina for use in the heating operations has a surface area between 40 and 400 m²/g. Suitable alumina includes, for example, gamma-alumina and eta-alumina. Alpha-alumina is not desirable because of its low surface area and its lack of reactivity in the present method. The heating of the alumina can be carried out in any convenient manner, preferably by a known calcining procedure in an oxygen-containing atmosphere. An inert or reducing atmosphere is also suitable. The length of time for which the alumina is subjected to the heating step is between about 20 minutes and 24 hours, preferably between about ½ hour and 4 hours.

Prior to incorporation into the catalyst particles, the alumina-containing solid to be used should be sized so that the solid is made up of particles having an average particle diameter of less than 50 microns. Preferably the alumina-containing solid is in the form of particles having an average particle diameter of less than 10 microns. The finely divided alumina-containing solid need not necessarily be made up solely of alumina. Silica must not be present in the finely divided solid in any substantial concentration, however, and the finely divided solid is preferably made up of substantially pure alumina.

The finely divided alumina-containing solid is incorporated into the cracking catalyst particles in an amount sufficient to provide between 0.1 and 20 weight percent alumina in the catalyst particles, based on the total weight of the catalyst particles after addition of the calcined alumina-containing solids. Preferably the finely divided, calcined alumina is incorporated into the catalyst particles in an amount sufficient to provide about 1 weight percent to about 10 weight percent of the catalyst. The total concentration of the calcined, finely divided alumina in the catalyst is, of course, not necessarily the same as the total concentration of alumina in the catalyst. The total amount of alumina in the catalyst is less than 80 weight percent of the total catalyst weight and preferably less than 70 weight percent. The finely divided alumina-containing solid can be incorporated into the catalyst at any time prior to use of the catalyst in an FCC system. Most conveniently, the finely divided alumina can be added to the catalyst during one or more stages of manufacture, for example, at the stage of manufacture when the zeolite component of the catalyst is combined with an inorganic matrix material, or, alternatively, prior to spray-drying of the catalyst particles, or at any equivalent stage of manufacture. The exact stage of catalyst manufacture at which it is most desirable or convenient to incorporate the calcined, finely divided alumina will, of course, depend on the particular conventional procedure otherwise used to produce the catalyst, and will be a matter of choice well within the ability of one skilled in the art. In the case of FCC catalysts in which the zeolite component is added, rather than being produced in situ, it is preferred to incorporate the finely divided alumina particles into the catalyst at the same time as the incorporation of the zeolite. In the case of FCC catalyst in which a zeolite is produced in situ by treatment of the catalyst preparation, e.g. by heat and pressure treatment of non-zeolitic clay, then it is preferred to incorporate the finely divided alumina just prior to spray-drying the catalyst.

According to the invention, catalysts in which the finely divided alumina-containing solid is incorporated are used as cracking catalysts in an FCC process. The alumina-containing catalysts are used in a conventional manner suitable for the particular FCC system in which the catalyst is to be used. The previously heated, finely divided alumina which is incorporated into the catalyst particles reacts, in the FCC catalyst regenerator, with sulfur oxides in the flue gas in the regenerator to form at least one sulfur-containing solid, or solid compound including a sulfur component, for example, a sulfate of aluminum. The level of sulfur oxides in the regenerator flue gas is thereby substantially lowered. When the catalyst particles are cycled from the catalyst regenerator back into the cracking reaction zone, the sulfur-containing solids formed in the regenerator then contact the hydrocarbon feed which is being processed in the reaction zone, resulting in formation of fluid sulfur compounds including hydrogen sulfide. The hydrogen sulfide and other fluid sulfur compounds thereby produced are removed from the reaction zone along with the hydrocarbon stream which has been subjected to cracking. The catalyst particles are thus freed from the sulfur component, and then eventually are returned to the catalyst regenerator so that the alumina component can again be used for reaction with sulfur oxides in the regenerator flue gas.

PREFERRED EMBODIMENT OF THE INVENTION

In a preferred embodiment of the invention, alumina monohydrate is calcined for ½ hour at a temperature of 1500° F. to form gamma alumina. The calcined alumina is ground into finely divided particles having an average particle diameter of less than 10 microns. A cracking catalyst is prepared in a conventional manner by mixing 10 weight percent of an acidic, finely divided, low-sodium zeolite and 10 weight percent of the finely divided, calcined alumina with a silica-alumina gel. The resulting mixture is then dried and formed into FCC catalyst particles of conventional size. A conventional FCC system is used. The feed to the system is a conventional cracking feed boiling in the range from 450° F.–950° F. The feed contains about 2 weight percent sulfur, a relatively high sulfur content for an FCC feed. In processing such a feed with a conventional catalyst in the particular system used, at conventional cracking and catalyst regenerating conditions suitable for use in the particular system, the amount of sulfur oxides (calculated as $SO_2$) in the flue gas produced in the catalyst regenerator would be expected to be about 1500 parts per million (volume). Addition to the system of a particulate solid carbon monoxide combustion promoter in an amount sufficient to provide 1 ppm (weight) platinum with respect to the total weight of circulating catalyst, is not expected to lower the level of sulfur oxides in the regenerator flue gas to a substantial degree if a conventional catalyst were used. According to the invention, the catalyst preparation made as described above is used in an amount conventional for the particular FCC system at the conventional cracking and regeneration conditions suitable for use in that system. Sulfur oxides in the regenerator flue gas are reacted with the finely divided, previously calcined alumina contained in the catalyst particles, forming at least one solid compound including a sulfur component. Regenerated catalyst particles containing the sulfur-containing solid therein are cycled from the catalyst regenerator to the FCC reaction zone. In the reaction zone, the sulfur-containing solid compound contacts the hydrocarbon feed at cracking conditions, resulting in removal of the sulfur component from the catalyst particles and resulting in the formation of fluid sulfur compounds including hydrogen sulfide. The hydrogen sulfide and the other fluid sulfur compounds exit the cracking zone along with the hydrocarbon effluent and the hydrogen sulfide is removed from the cracking zone effluent in a conventional manner. Measurement of the sulfur oxides level in the FCC regenerator flue gas shows that the level of sulfur oxides is only about 250 ppm (volume), as compared to the conventional level of 1500 ppm which would be expected without the catalyst according to the invention. Thus, use of the catalyst according to the invention provides a very substantial reduction in the level of SOx contained in the regenerator flue gas.

EXAMPLES

The following examples are provided in order to demonstrate the surprising and advantageous results which can be obtained using a catalyst prepared according to the invention, by providing a substantial lowering of the level of SOx in FCC regenerator flue gas.

EXAMPLE 1

An aqueous solution containing aluminum sulfate and sulfuric acid was prepared. Another aqueous solution of sodium silicate was prepared. The two solutions were rapidly mixed and stirred to form a clear dispersion. The components of the solution were coprecipitated at a final pH of 8 by slow adding, with stirring, an aqueous solution of 4 molar ammonium hydroxide solution. The resulting gel slurry had a silica/alumina weight ratio of 5/1. Alumina monohydrate was calcined at 1500° F. for ½ hour to form gamma alumina with surface area 150 $m^2/g$. The calcined alumina was ground, and finely divided particles having an average particle diameter of less than 7 microns were separated. Enough of the finely divided alumina was mixed with the gel slurry described above so that the resulting mixture included 10 weight percent of the finely divided, calcined alumina on a dry solids basis. The mixture had a silica/alumina weight ratio of 3/1. This mixture was then washed, dried, calcined and ground into particles of a size between 200 and 350 mesh. This composition was labeled "Catalyst A".

EXAMPLE 2

A silica-alumina gel slurry was prepared in exactly the same manner as in Example 1. For purposes of comparison with the composition labeled Catalyst A, prepared as described in Example 1, an in-situ precipitated alumina gel was added to the previously precipitated silica-alumina by adding an increment of aluminum sulfate solution and ammonia solution to maintain the pH at 8.0. The resulting mixture of silica-alumina gel and alumina gel contained 10 weight percent alumina from the added alumina gel on a dry solids basis. The over-all silica-alumina weight ratio of the resulting mixture was 3/1. This mixture was then washed, etc., in exactly the same manner as the composition of Example 1. This composition was labeled "Catalyst B".

EXAMPLE 3

A third silica-alumina gel was prepared in exactly the same manner as was used to prepare the gels described in Examples 1 and 2. For the purposes of comparison with the preparations of Examples 1 and 2, an extremely pure aluminum monohydrate (boehmite) was obtained. Enough of the aluminum monohydrate was mixed with the gel so that the mixture contained 10 weight percent of alumina from the aluminum monohydrate on a dry solids basis. The mixture had an over-all silica/alumina weight ratio of 3/1. This mixture was then treated further by washing, etc., in exactly the same way as the mixtures described in Examples 1 and 2. The resulting composition was labeled "Catalyst C".

EXAMPLE 4

Catalyst A, prepared according to the invention, was tested for its sulfur-oxides adsorption capacity in comparison to the capacities of Catalyst B and Catalyst C. Both Catalyst B and Catalyst C had exactly the same over-all silica/alumina weight ratio as Catalyst A, and all 3 of the catalysts had been prepared by adding alumina to the same type of silica-alumina cogel, with exactly 10% of the catalyst as alumina being added to each of the gels. Only the alumina in Catalyst A had been calcined prior to mixture with the cogel. Samples of a measured amount of each of the 3 catalysts were separately tested by the steps of (1) heating the sample to 1200° F. in a flowing gas containing 2 volume percent nitrogen, 15 volume percent carbon dioxide and 10 volume percent steam in nitrogen until the weight of the sample was stable; (2) heating the sample in a flowing gas containing 10 voume percent hydrogen and 10 volume percent steam in nitrogen at 1200° F. until the weight of the sample was again stable; (3) repeating step (1); and (4) adding 0.2 volume percent sulfur dioxide to the gas mixture used in step (3) and continuing treatment until the weight of the sample was again stable. The weight change observed during step (4) was a measure of the capacity of the sample for reaction with sulfur oxides at the same temperature and in the same type of atmosphere as would be encountered in an FCC catalyst regenerator. The results of the tests for each of the samples are shown in the Table.

TABLE

Sulfur Oxides Adsorption Capacity

| Sample | Capacity, ppm (wt.) |
|---|---|
| Catalyst A | 1700 |
| Catalyst B | <100 |
| Catalyst C | <100 |

It was found, as shown in the Table, that only Catalyst A had a substantial capacity for reaction with sulfur oxides to form a sulfur-containing solid in the catalyst particles, even though all 3 of the catalyst samples had the same total concentration of alumina and each had been made by adding 10 weight percent of alumina to exactly the same type of silica-alumina cogel.

The preferred embodiment of the invention having been described, many variations and obvious modifications of the invention will be apparent to those skilled in the art. Such modifications and variations are intended to be included within the scope of the invention, as defined in the appended claims.

What is claimed is:

1. In a fluid catalytic cracking process including the steps of (a) cracking a sulfur-containing hydrocarbon stream in contact with a fluidized bed of cracking catalyst particles, said particles containing a silica component, in a cracking zone at cracking conditions including a temperature in the range from 800° F. to 1300° F., whereby sulfur-containing coke is deposited on said catalyst, and removing the hydrocarbon stream from said cracking zone; (b) passing coke-containing catalyst from said cracking zone and an oxygen-containing gas into a cracking catalyst regeneration zone, burining off said sulfur-containing coke therein at a temperature in the range from 1000° F. to 1500° F. to form a flue gas containing sulfur oxides, and removing said flue gas from said catalyst regeneration zone; and (c) returning the resulting coke-depleted catalyst from said catalyst regeneration zone to contact with said hydrocarbon stream in said cracking zone, the improved method for decreasing the amount of sulfur oxides in said flue gas which comprises:

(1) physically incorporating into at least a portion of said catalyst particles, before contacting said catalyst particles with said feed, from 0.1 to 25 weight percent of a finely divided solid consisting essentially of alumina, said solid having an average particle diameter of less than 50 microns, said alumina having a surface area of between 40 to 400 square meters per gram, and said alumina having been heated to a temperature between about 700° F. and about 1600° F. before physical incorporation into said catalyst particles;

(2) forming a solid compound including a sulfur component by reacting sulfur trioxide with said alumina in said finely divided solid in said regeneration zone; and (3) forming hydrogen sulfide in said cracking zone by contacting said solid compound with said hydrocarbon stream.

2. An improved process according to claim 1 wherein said finely divided solid has an average particle diameter of less than 10 microns.

3. An improved process according to claim 1 wherein said catalyst particles include a zeolitic crystalline aluminosilicate component dispersed in a matrix comprising a gel or clay aluminosilicate, and said finely divided solid is also dispersed in the matrix.

4. An improved process according to claim 1 wherein said flue gas removed from said regeneration zone includes at least 1 volume percent molecular oxygen.

5. An improved process according to claim 1 wherein a particulate solid carbon monoxide oxidation promoter comprising a noble metal component associated with a refractory inorganic oxide component is circulated between said cracking zone and said regeneration zone physically mixed with said catalyst particles.

6. An improved process according to claim 1 wherein said alumina is heated to a temperature between 1300° F. and 1500° F. before physical incorporation into said catalyst particles.

7. In a process for cracking sulfur-containing hydrocarbons in the absence of added molecular hydrogen in a cracking system employing an inventory of particulate solids comprising cracking catalyst particles, said particles, including a silica component, wherein said inventory is circulated between a cracking zone and a catalyst regeneration zone, said hydrocarbons are cracked in contact with said catalyst particles and sulfur-containing coke is formed on said catalyst particles at cracking conditions in said cracking zone, sulfur oxides are formed by burning coke off said catalyst particles at cataylst regeneration conditions in said regeneration zone, a sulfur-containing solid is formed in said regeneration zone by reacting said sulfur oxides with alumina in said catalyst particles, and hydrogen sulfide is formed in said cracking zone by contacting said hydrocarbons with said sulfur-containing solid, the improvement comprising:

circulating in said cracking system particles of cracking catalyst having physically incorporated therein from 0.1 to 25 weight percent of a finely divided solid consisting essentially of alumina, said alumina having been heated to a temperature between about 700° F. and 1600° F. before incorporation into said catalyst particles and having a surface area of between 40 and 400 square meters per gram, and said finely divided solid having an average particle diameter of less than 50 microns.

8. An improved process according to claim 7 wherein said alumina is heated to a temperature between 1300° F. and 1500° F. before incorporation into said catalyst particles.

9. An improved process according to claim 7 wherein said finely divided solid has an average particle diameter of less than 10 microns.

10. An improved process according to claim 7 wherein a particulate solid carbon monoxide oxidation promoter comprising a noble metal component associated with a refractory inorganic oxide component is circulated between said cracking zone and said regeneration zone in physical admixture with said catalyst particles.

* * * * *